United States Patent
Andres

(10) Patent No.: US 9,787,091 B2
(45) Date of Patent: Oct. 10, 2017

(54) SYSTEMS AND METHODS FOR CONTROLLING A POWER CONVERSION SYSTEM

(71) Applicant: General Electric Company, Schenectady, NY (US)

(72) Inventor: Joao Luiz Andres, Austin, TX (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 14/856,111

(22) Filed: Sep. 16, 2015

(65) Prior Publication Data

US 2017/0077819 A1   Mar. 16, 2017

(51) Int. Cl.
| | | |
|---|---|---|
| *H02J 1/10* | (2006.01) | |
| *H02M 3/335* | (2006.01) | |
| *H02M 3/337* | (2006.01) | |
| *H02M 1/00* | (2006.01) | |

(52) U.S. Cl.
CPC ........... *H02J 1/102* (2013.01); *H02M 3/3376* (2013.01); *H02M 3/33515* (2013.01); *H02M 2001/007* (2013.01); *H02M 2001/008* (2013.01)

(58) Field of Classification Search
CPC ........... H02M 3/33507; H02M 3/3376; H02M 3/33515; H02M 2001/007; H02M 2001/008; H02J 1/102
See application file for complete search history.

(56) References Cited

U.S. PATENT DOCUMENTS

| | | | |
|---|---|---|---|
| 5,781,421 A | 7/1998 | Steigerwald et al. | |
| 6,011,382 A | 1/2000 | Littlefield et al. | |
| 6,737,840 B2 | 5/2004 | McDonald et al. | |
| 7,388,358 B2 | 6/2008 | Duan | |
| 8,957,607 B2 | 2/2015 | Raval et al. | |
| 2010/0231183 A1* | 9/2010 | Jan ........................ | H02M 3/156 323/282 |
| 2013/0163287 A1 | 6/2013 | Pal et al. | |
| 2013/0223108 A1* | 8/2013 | Xu ..................... | H02M 3/33507 363/21.17 |
| 2013/0279204 A1* | 10/2013 | Yang ................. | H02M 3/33507 363/21.01 |

(Continued)

OTHER PUBLICATIONS

Xu et al., "Bifrequency Pulse-Train Control Technique for Switching DC-DC Converters Operating in DCM", Industrial Electronics, IEEE, Aug. 2011, vol. 58, Issue 8, pp. 3658-3667.

(Continued)

*Primary Examiner* — Jue Zhang
(74) *Attorney, Agent, or Firm* — General Electric Company

(57) ABSTRACT

Systems and methods for controlling a power conversion system are provided. The power conversion system includes a power converter comprising a primary stage coupled to a secondary stage to generate an output direct current (DC) voltage from an input voltage received from an input voltage source. The power conversion system also includes a control circuit coupled to the power converter. The control circuit is configured to implement a self-adjusting set-point control algorithm to generate the output DC voltage without using an input voltage measurement, wherein the output DC voltage follows the input voltage over at least a portion of an input voltage range.

20 Claims, 6 Drawing Sheets

(56) References Cited

U.S. PATENT DOCUMENTS

| | | |
|---|---|---|
| 2013/0343094 A1 | 12/2013 | Karlsson et al. |
| 2014/0160799 A1 | 6/2014 | Gu et al. |
| 2015/0055375 A1* | 2/2015 | Karlsson .......... H02M 3/33592 363/17 |
| 2015/0200598 A1* | 7/2015 | Kha .................. H02M 3/33523 363/17 |

OTHER PUBLICATIONS

Jain, P et al., "Asymmetrical pulse width modulated resonant DC/DC converter topologies", Power Electronics Specialists Conference, 1993. PESC '93 Record., 24th Annual IEEE, Jun. 20-24, 1993, pp. 818-825, Seattle, WA.

\* cited by examiner

SYSTEMS AND METHODS FOR CONTROLLING A POWER CONVERSION SYSTEM

BACKGROUND

The field of the invention relates to power conversion and, more specifically, to a power conversion system and a method of controlling a power conversion system.

As the human population grows, there is a constant need to provide more power without using up or misusing Earth's resources. Power converter circuit market trends indicate that each new generation of converter products generally deliver increased power density and higher efficiency, having reduced total power loss. In one example application, an intermediate bus power system includes a bus converter circuit that provides a DC bus voltage to a plurality of point-of-load converters circuits (POLs) through an intermediate bus structure. Each of the plurality of POLs provides a separate output voltage to a load. It is beneficial to have an efficient system because the power is distributed to multiple loads.

BRIEF DESCRIPTION

In one aspect, a power conversion system is provided. The power conversion system includes a power converter comprising a primary stage coupled to a secondary stage to generate an output direct current (DC) voltage from an input voltage received from an input voltage source. The power conversion system also includes a control circuit coupled to the power converter. The control circuit is configured to implement a self-adjusting set-point control algorithm to generate the output DC voltage without using an input voltage measurement, wherein the output DC voltage follows the input voltage over at least a portion of an input voltage range.

In another aspect, a method of controlling a power conversion system operation is provided. The method includes generating an output direct current (DC) voltage from an input voltage received from an input voltage source using a power converter having a primary stage coupled to a secondary stage. The method also includes implementing, by a control circuit coupled to the power converter, a self-adjusting set-point control algorithm to generate the output DC voltage without using an input voltage measurement, wherein the output DC voltage follows the input voltage over at least a portion of an input voltage range.

In yet another aspect, a control circuit for a power converter is provided. The control circuit is configured to implement a self-adjusting set-point control algorithm to generate an output DC voltage without using an input voltage measurement of the power converter, wherein the output DC voltage follows the input voltage over at least a portion of an input voltage range.

DETAILED DESCRIPTION

Figure 1:
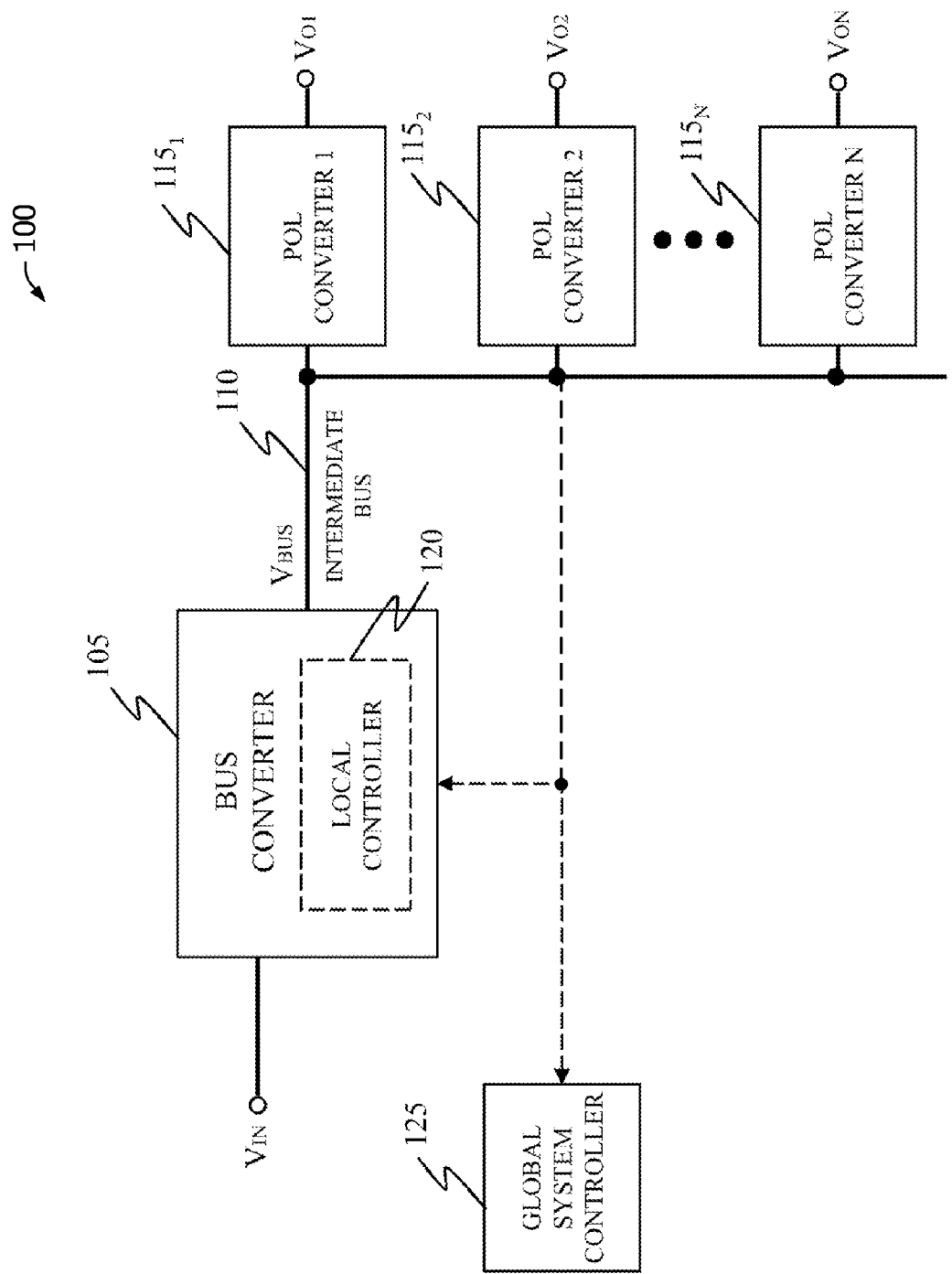
FIG. 1 illustrates a block diagram of an embodiment of as an intermediate bus power system employing a power conversion system constructed according to the principles of the present disclosure.

This disclosure provides a power converter circuit system (e.g. having a switching voltage regulator) that is efficient and operates at high duty cycle over most of or an entire input voltage operating range while providing regulation and its attendant benefits. In one embodiment, an output voltage of the power converter system is proportional to the input voltage over some sub-range of the input voltage while the system still remains in active regulation (e.g. by using a switching duty cycle just below the maximum duty cycle, within 5-10% of maximum or within test-optimized values). The sub-range of the input voltage that is tracked is based on adapting and automatically (self) adjusting a set point value that then determines the output voltage or adjusts the output voltage. For example, a dc-dc bus converter includes a processor that is configured to automatically adjust the output voltage regulation set-point without measuring input voltage. The processor selects the output voltage regulation set-point value such that the duty cycle is as high as possible at that operating condition and yet still provides active regulation of the dc-dc bus converter. The system uses the set-point value as a reference that is compared with the output voltage. The processor then adjusts the duty cycle to produce the desired output voltage. In this manner, the converter system provides beneficial load regulation, line/load transient and other desirable characteristics. For instance, if the set-point value is selected to be proportional to the input voltage, the volt-time (or maximum amount of time that an inductor or transformer can have a constant voltage applied to it) applied across the output inductor over the operating input voltage range remains substantially constant. The inductor can then be readily optimized for a desired output ripple and saturation flux density. The output ripple of the converter and overall RMS (root-mean-square or average) current flowing through the inductor can also be reduced, which provides a quieter output power.

The procedures described below can be employed in various types of power converter electronics such as DC to DC converters, bus converters, rectifiers and so on. For example, a bus converter system can take a noisy input voltage from an AC or DC source that varies unevenly over time or over a range of voltages such as 45 to 56 volts; and then the bus converter system filters the input voltage source and produces and distributes a regulated, unregulated, or varied regulation output bus voltage. The bus converter system with ensuing POLs can function over a wide input bus voltage range where the subsequent POLs then provide precise, regulated step-down or step-up output voltages. In addition, POLs exhibit a constant input power characteristic assuming a constant efficiency. These POL converters may then be used to power electronic loads that need a fixed supply voltage having precise regulation in order to operate properly. Although POLs can operate over a wide input range and tolerate bus voltage variations inherent in unregulated or semi-regulated bus converters, it is advantageous to have the intermediate bus converter system. The intermediate bus converter produces good output load regulation, low output impedance, and good transient response characteristics so that the small, inexpensive POLs (attached to the output of the bus converter) can operate easily and properly. For instance, the low output impedance of the intermediate, regulated bus converter helps to minimize cross-talk between POLs due to lower common coupling impedance.

Overall power loss considerations in high-efficiency, isolated and regulated bus converters lead to an understanding of the loss contribution due to each element of the bus converter design. For example, one loss contribution entails resistive losses. Because bus converters provide high output currents, particular attention is given to resistive power losses (i.e., $I^2R$ losses) especially on the output or secondary side of the power converter. Additionally, operating a power converter at a high duty cycle yields increased efficiency since this provides reduced average or RMS (root-mean-square) currents flowing in the power stage. Further, operating a power converter at slightly less than the maximum duty cycle over the entire input voltage range reduces the volt-time specification on an output inductor. These are beneficial since they enable the use of an output inductor with lower resistance, while still avoiding inductor saturation over an entire input voltage range. Other than at the output, the input inductance value may also be reduced as well, since the high duty cycle reduces input ripple current.

FIG. 1 illustrates a block diagram of an embodiment of an intermediate bus power system 100, employing power conversion circuits constructed according to the principles of the present disclosure. Intermediate bus power system 100 includes a bus converter 105 that converts an input AC or DC voltage $V_{IN}$ received from an input voltage source into a DC bus voltage $V_{BUS}$ on an intermediate bus 110. In an exemplary embodiment, intermediate bus power system 100 also includes a plurality of point-of-load converters (POLs) $115_1$, $115_2$, . . . , $115_N$, having inputs connected to the intermediate bus 110, that supply a corresponding plurality of output voltages $V_{O1}$, $V_{O2}$, . . . , $V_{ON}$ from the bus voltage $V_{BUS}$.

Intermediate bus power system 100 further includes a controller 120 and a global system controller 125 that are coupled to bus converter 105 and control system's 100 overall operations. In one embodiment, controller 120 operates in conjunction with global system controller 125, where global system controller 125 may be a more general or hierarchical controller that provides supervisory and overriding control of intermediate bus power system 100. In other embodiments, global system controller 125 and/or controller 120 may be in communication with one or more of POLs $115_1$, $115_2$, . . . , $115_N$.

The exemplary bus converters in this disclosure employ a full-bridge or half-bridge power stage. However, other topologies such as a two-switch forward, LLC, fly-back etc., may also utilize these concepts. Higher power bus converters may employ the full-bridge topology because it offers good transformer utilization while lower power bus converters may employ a less complex half-bridge topology. Moreover, controlled synchronous rectifiers provide substantial efficiency advantages when employed in bus converters because the output voltage provided by these converters permits the use of low-loss devices.

The concepts described herein may be used with a variety of isolated or non-isolated power topologies. However, the following description focuses on an isolated full-bridge topology because it is well suited for high power bus applications. It offers the capability of operating near a 100 percent duty cycle, which provides substantially continuous power flow. The duty cycle D is defined as the switching transistor on-time divided by a time period of a full-cycle. Also, the maximum voltage stress on input power switches is equal to the input voltage, ignoring switching transients, which permits selection of lower conduction resistance for switching devices such as FETs (field effect transistors). The output voltage to input voltage transfer ratio is given by the following equation.

$$V\text{out}=D*(V\text{in}/n) \qquad \text{Eq. (1)}$$

In Eq. (1), n is the ratio of the bus converter transformer secondary turns to primary winding turns and D is the duty cycle. The primary side of the transformer (e.g., 210 in FIG. 2) is coupled to input voltages and is capable of seeing a $+V_{DC}$ to $-V_{DC}$ voltage swing from one half-cycle to the next half-cycle, thus yielding good utilization of the magnetic structure.

Figure 2:
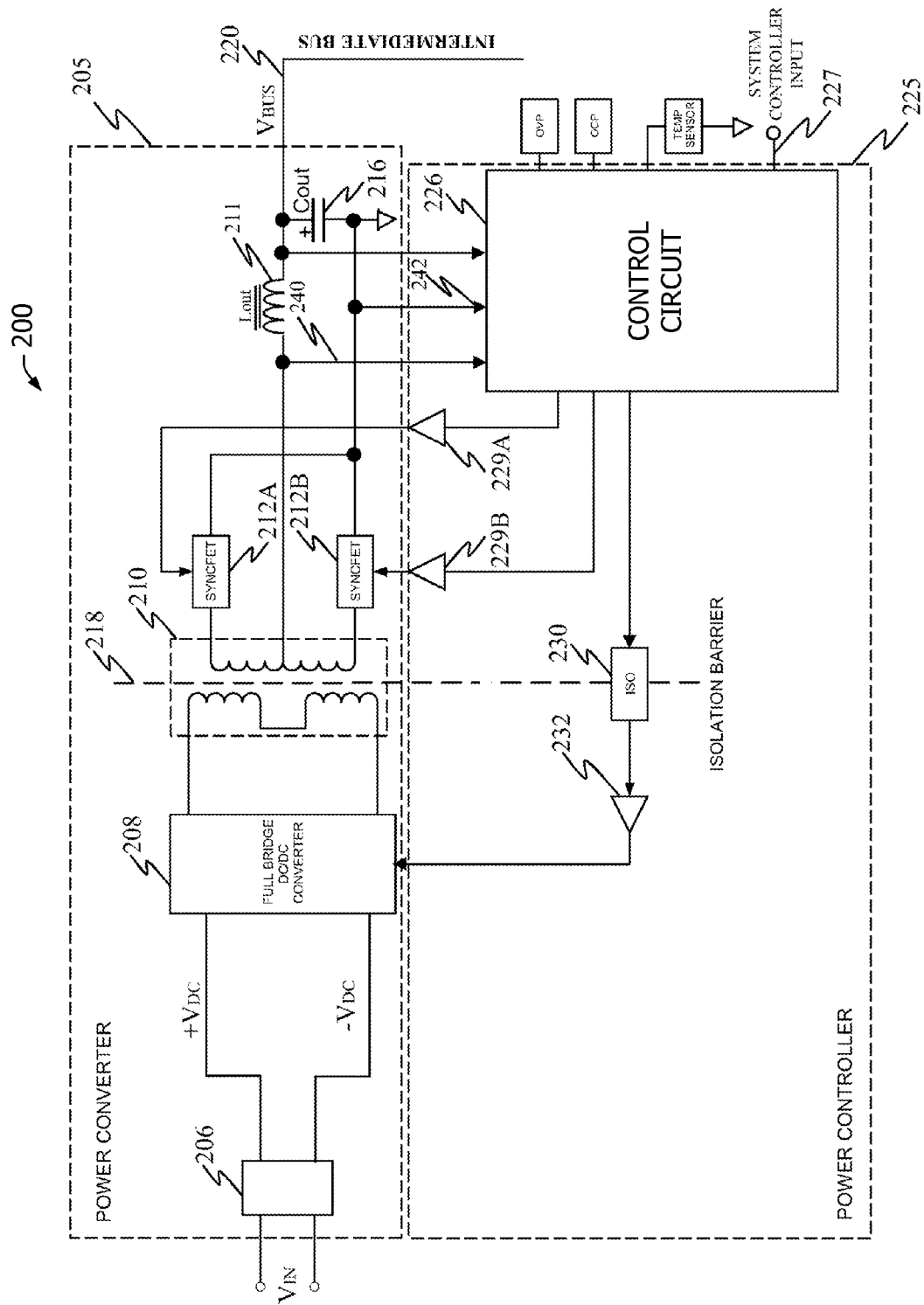
FIG. 2 illustrates a block diagram of a power conversion module 200 that may be employed in the bus converter shown in FIG. 1.

FIG. 2 illustrates a block diagram of a power conversion system 200 that may be employed in bus converter 105 (shown in FIG. 1). Power conversion system 200 utilizes secondary control architecture and includes a power converter 205 and a power controller 225. Power converter 205 includes primary and secondary stages that are electrically isolated from each other across an isolation barrier 218 of transformer 210, and further includes separate primary and secondary grounding structures. Power controller 225 also uses isolation barrier 218 to electrically isolate primary and secondary stage components referenced to the separate grounding structures.

Power converter 205 is configured to convert an input voltage $V_{IN}$ (or a differential voltage $+V_{DC}$ to $-V_{DC}$) received from an input voltage source to a DC output voltage $V_{BUS}$ on an intermediate bus 220. Power converter 205 includes an input voltage conditioning module 206, a full bridge DC-DC converter 208, a main power transformer 210, an output inductor 211, first and second synchronous output switches (e.g., FETs) 212A, 212B, and an output filter capacitor (Cout) 216. Depending on the design specification and application, output filter capacitor (Cout) 216 may include an output filter capacitor contained within power converter 205 and/or a filter capacitor that is external to power converter 205. Main power transformer 210 forms part of isolation barrier 218. Power controller 225 includes a control circuit 226 having a system controller input 227, first and second secondary switch drivers 229A, 229B, an optical isolator 230 and a primary switch driver 232. Optical isolator 230 also forms part of isolation barrier 218. Additional elements such as bias supplies to power up the circuits are not shown.

During operation, input voltage conditioning module 206 provides rectification when the input voltage $V_{IN}$ is an AC signal. It additionally provides filtering of the input voltage $V_{IN}$ for both the AC signal and for the case of a DC input voltage. In one embodiment, full bridge DC-DC converter 208 provides a full wave signal to primary windings of main power transformer 210. The secondary windings of main power transformer 210 then provide a full wave secondary signal to the first and second synchronous output switches 212A, 212B for rectification. A rectified output signal is provided from a secondary winding center tap of main power transformer 210 to an output filter that includes output inductor 211 and output filter capacitor 216. A bus voltage $V_{BUS}$ is provided on an intermediate bus 220, as shown.

Power controller 225 provides operating control of power converter 205, enabling it to deliver output voltage and output current to intermediate bus 220, based on established or self-adjusting set points and feedback information from the converter output. Control circuit 226 establishes control signals (e.g., pulse width modulation (PWM) signals) that are provided through the primary and first and second secondary switch drivers 232, 229A, and 229B to control conduction times of the primary and secondary stages. Alternatively, other control algorithms may vary the frequency to control the output, using frequency-division multiplexing (FDM) modulation, or a combination of PWM and FDM. Optical isolator 230 provides electrical isolation for primary control signals, as noted above. Although analog or analog-mixed signal embodiments are possible (e.g. using amplifiers, comparators, filters, clock circuits, ramp circuits, etc.), control circuit 226 described herein is embodied as a digital controller used to perform regulation and control of power converter 205. More specifically, control circuit 226 may include an algorithm or algorithms embodied in computer code executing on a digital controller IC. The digital controller entails few components or chips on a printed circuit board, thus saving board space. The digital controller also permits and end-users to make revisions to the software, such as programming an initial set-point value and other parameters or monitoring a system performance. The digital controller forms part of a control loop to transform an unregulated voltage Vin to a regulated, unregulated, or varied regulation output voltage $V_{BUS}$ that is much cleaner and can be readily distributed to and used by, for example, POLs.

In the illustrated embodiment of FIG. 2, control circuit 226 is configured to implement a self-adjusting set-point control algorithm to generate the DC bus voltage $V_{BUS}$ without measuring the input voltage $V_{IN}$, wherein the DC bus voltage $V_{BUS}$ follows the input voltage $V_{IN}$ over at least a portion of an input voltage range. Control circuit 226 selects an output voltage regulation set-point value to facilitate maximizing a PWM duty cycle of power converter 205. The set-point value is selected such that the duty cycle is as large as possible for the operating condition and yet still provides an active regulation loop. This ensures that power converter 205 provides the desired load regulation and line/load transient characteristics. It uses the set-point as a reference, which is then compared to the output voltage by a control loop. In one embodiment, control circuit 226 is configured to implement the self-adjusting set-point control algorithm through active regulation digital control of power converter 205.

The control loop then adjusts the duty cycle to produce a desired output voltage. If the regulated set-point is selected to follow the input voltage, the volt-time impressed across the output inductor 211 over the operating input range is essentially constant and less than that used for a conventional fixed output voltage, regulated converter. The output inductor 211 can then be optimized (e.g. decreasing turns, lower inductance) for an output ripple and saturation flux density. The output ripple of the power converter 205 and overall RMS current flowing through the output inductor 211 will also be reduced.

A maximum duty cycle point for the power converter 205 is determined by design specifications for the chosen power stage topology or customer's applications and so on. To insure proper switching in the converter, time is allotted for turn-on and turn-off of the various switching devices and synchronous rectifiers. This allotted turn-on and turn-off time (i.e., dead time) is also included in determining a maximum duty cycle operation. The concept is to operate power converter 205 at a DC bus voltage $V_{BUS}$ corresponding to producing a duty cycle that is slightly less than the maximum duty cycle. This provides a regulation loop that is active along with requisite line, load and transient characteristics of a regulated converter.

Figure 3:
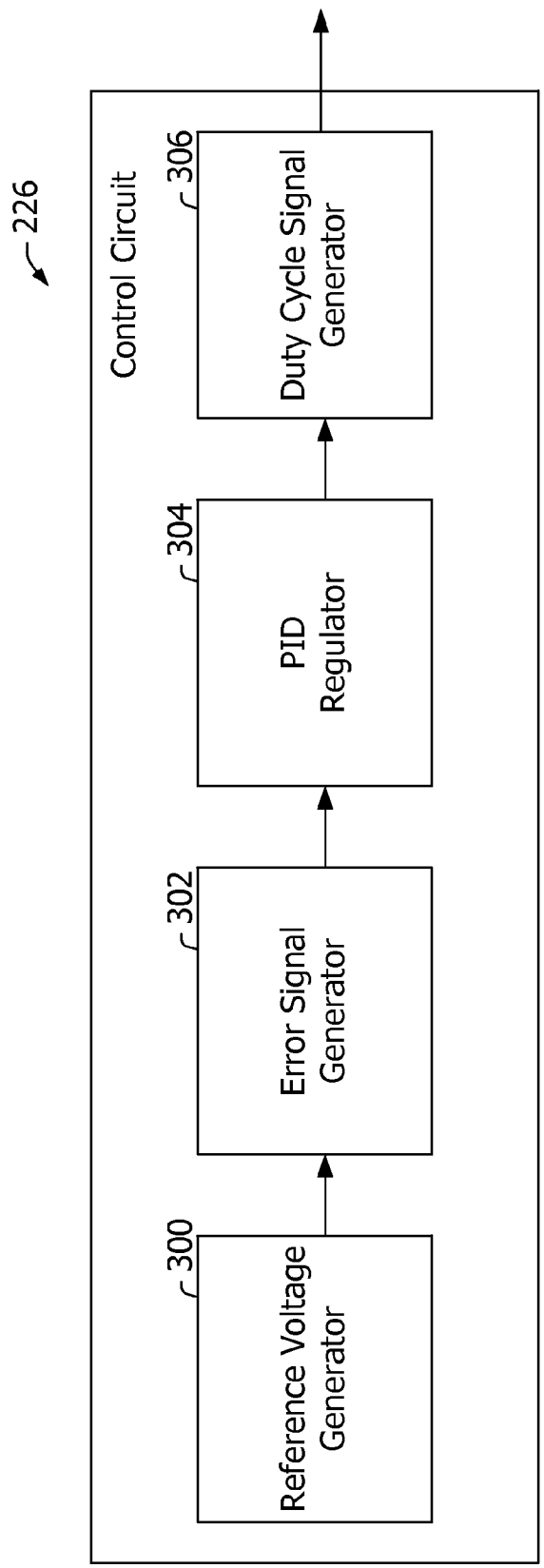
FIG. 3 is a schematic block diagram of the control circuit shown in FIG. 2.

FIG. 3 is a schematic block diagram of control circuit 226 (shown in FIG. 2). In an exemplary embodiment, control circuit 226 includes a reference voltage generator 300, an error signal generator 302, a PID regulator 304, and a duty cycle signal generator 306.

Reference voltage generator 300 is configured to generate a reference voltage $V_{ref}$ signal based on a duty cycle of power converter 205 (shown in FIG. 2). Reference voltage generator 300 generates the reference voltage $V_{ref}$ signal without receiving an input voltage $V_{IN}$ measurement. In an exemplary embodiment, the reference signal $V_{ref}$ is not constant, but instead is proportional to the input voltage $V_{IN}$ of power converter 205, even though control circuit 226 does not directly measure the input voltage $V_{IN}$.

Error signal generator 302 is configured to receive a signal indicative of a measured output bus voltage $V_{BUS}$ of power converter 205, as well as the reference signal $V_{ref}$ generated by reference voltage generator 300. Error signal generator 302 is also configured to generate an error signal $V_e$ based on a comparison of the reference signal $V_{ref}$ and the measured output voltage $V_{BUS}$. The error signal $V_e$ is then fed into PID regulator 304. PID regulator 304 is configured to regulate an output voltage set-point in proportion to the input voltage $V_{IN}$ without directly measuring the input voltage $V_{IN}$. More specifically, PID regulator 304 is configured to generate a PWM signal defining a duty cycle ratio based on the error signal $V_e$. Although described herein as being a PID regulator 304, regulator 304 may be any other type of regulator that enables control circuit 226 to function as described herein, for example, a PI regulator, a PD regulator, a P regulator, and/or an I regulator.

Duty cycle control signal generator 306 receives the output of PID regulator 304 and is configured to generate a duty cycle control signal D based on the error signal $V_e$ to control the duty cycle of the switches power converter 205.

Figure 4:
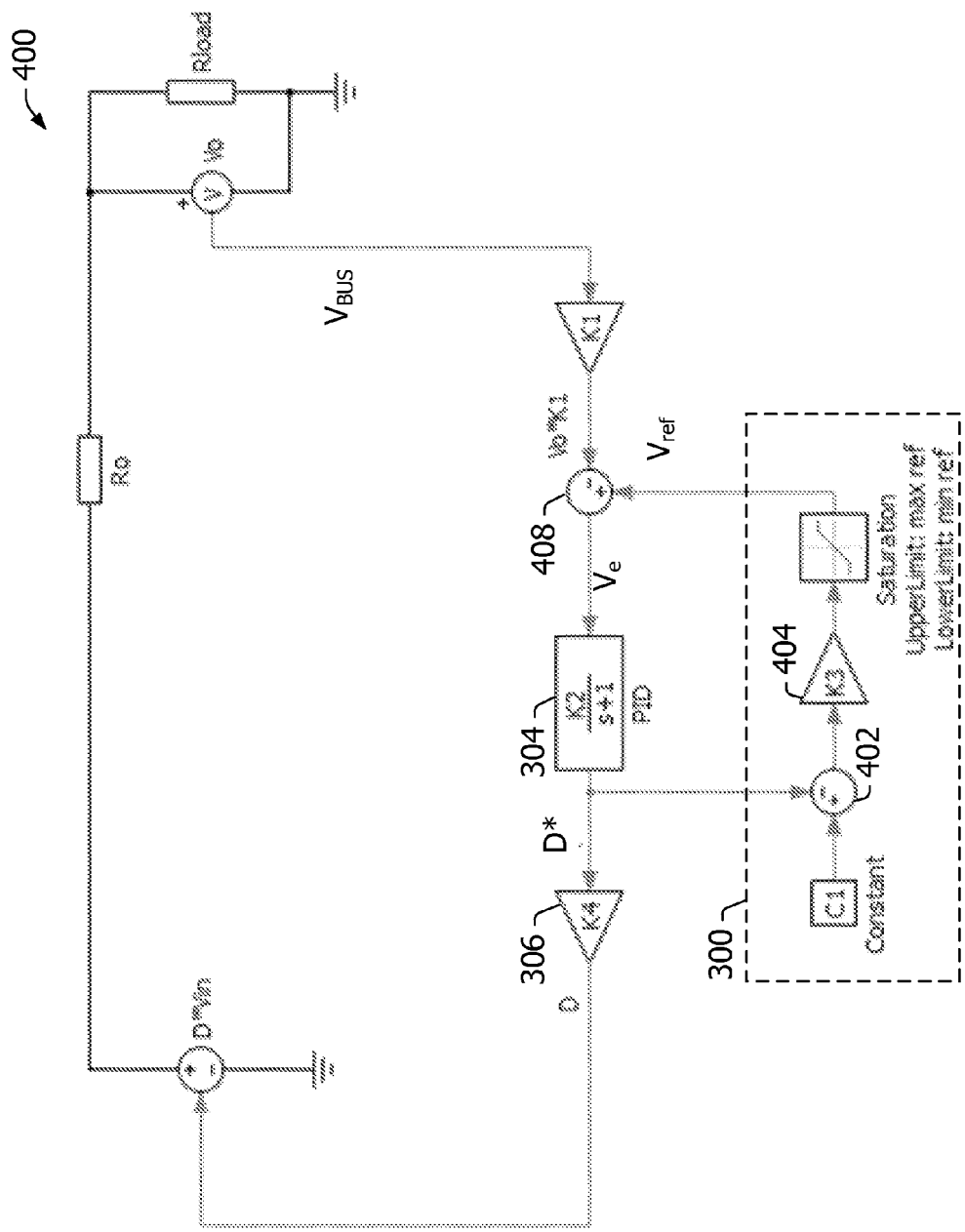
FIG. 4 is an exemplary control loop implemented by the control circuit shown in FIGS. 2 and 3.

FIG. 4 is an exemplary control loop 400 implemented by control circuit 226 (shown in FIGS. 2 and 3). In an exemplary embodiment, control circuit 226 implements control loop 400 to control the output voltage $V_{BUS}$ to be proportional to the input voltage $V_{IN}$ without directly measuring $V_{IN}$.

In an exemplary embodiment, reference voltage generator 300 includes a first summing junction 402 that receives a constant value C1 and an output of regulator 304 as inputs. Regulator 304 outputs a duty cycle feedback signal D*, which is a duty cycle ratio of an active duty cycle D divided by a value representative of a full duty cycle K4. Thus, D*=D/K4. First summing junction 402 compares or subtracts duty cycle feedback signal D* from constant C1, which is a linearization constant, and the result is input into a multiplier 404. Multiplier 404 multiplies the compared duty cycle feedback signal D* and linearization constant by a predetermined gain value K3. The output of multiplier 404 is passed through a filter 406, which filters the product output by multiplier 404 between predetermined upper and lower limits. After filtering, reference voltage generator 300 outputs the reference voltage $V_{ref}$ to error signal generator 302. The reference voltage $V_{ref}$ is given by:

$$V_{ref}=K3*(C1-(D/K4)) \qquad \text{Eq. 2}$$

Error signal generator 302 includes a second summing junction 408 that is configured to determine an error signal $V_e$ by comparing the reference voltage $V_{ref}$ with the measured output voltage $V_{BUS}$. More specifically, error signal generator 302 is configured to receive an output voltage signal representing the measured output voltage $V_{BUS}$ multiplied by a conversion factor K1. Error signal generator 302 is further configured to subtract, using a second summing junction 408, the measured output voltage $V_{BUS}$ from the reference voltage $V_{ref}$ to determine the error signal $V_e$, which is represented by:

$$V_e = V_{ref} - V_{BUS} * K1 \qquad \text{Eq. 3}$$

The error signal $V_e$ is provided to PID regulator 304. PID regulator 304 regulates an output voltage set-point by generating a duty cycle ratio required to obtain the desired output voltage $V_{BUS}$.

The output of PID regulator 304 is provided to duty cycle control signal generator 306. Control signal generator 306 comprises a PWM circuit that generates PWM signals based on the duty cycle ratio output by PID regulator 304 to control primary and first and second secondary switch drivers 232, 229A, and 229B (shown in FIG. 2).

The self-adjusting set-point control algorithm may be implemented with either analog or digital PWM control circuitry, or with a combination of mixed signal techniques. A digital PWM control algorithm implemented in a processor complements the pertinent measurement parameters such as temperature that are already digitally available (in analog to digital converter format), which together can be used to adjust or optimize the regulating set-point. Alternatively, other control algorithms may vary the frequency to control the output, using FDM modulation, or a combination of PWM and FDM. Further, the digital PWM or FDM controller can also account for variations caused by other parameters such as rapid changes in voltage or changes in resistivity and adapt the converter operation and duty cycle margin to the changes in real time. In one exemplary implementation, the digital PWM controller employs a look-up table based on measured parameters to calculate a required duty cycle for an output voltage set-point. The parameters for the look-up table (e.g., dead time) may be customized for each power converter unit wherein they are determined during the manufacturing process and stored in controller memory, thereby allowing the controller to optimize the power converter operation based on these parameters. The processor in the power converter efficiently transforms the input voltage $V_{IN}$ to the output voltage $V_{BUS}$ with a reduced amount of circuitry. Alternatively, the use of a processor readily allows an end-user to program a set-point value or a number of set point values.

If the controller calculates the maximum duty cycle at a given operating point in real time based on additional parameters such as temperature, the set-point control algorithm is adaptively configured to account for this. For example, suppose the maximum duty cycle at an input voltage of 55 volts and ambient temperature 60° C. is 99.5 percent as set by the controller based on a calculation or look-up table. The controller has, for example, a pre-selected duty cycle margin of four percent. Then, the controller selects an output voltage set-point that is based on a 95.5 percent duty cycle. If the ambient temperature increases to 80° C. at an input voltage of 55 volts and the maximum duty cycle is determined to be 99.0 percent, the controller then selects an output voltage set-point based on a 95 percent duty cycle. That is, the output voltage is determined by the maximum duty cycle at a given operating condition and a selected duty cycle margin.

In different embodiments, the duty cycle margin may be set either constant or variable depending on system parameters. Such an algorithm is utilized to maximize the operating duty cycle while maintaining an active control loop over the temperature and input voltage or other parametric changes that affect maximum duty cycle. This would help the converter deliver higher efficiency. As mentioned, the parameters for the calculation of the maximum duty cycle or data in the look-up table may vary from unit to unit to optimize the performance of each unit. This is accomplished during the manufacturing process.

In another embodiment, a digital PWM controller is also be programmed to have an adjustable regulation margin. For example, it reduces the regulation margin as the output voltage increases since load transients can be more easily accommodated by the output filter capacitors at the higher output voltages. Optionally, the output inductor characteristics are stored so that it can optimize the reference value based on the variation of the inductance variation with load, temperature or other parameters. It may use this information to insure that an output inductor does not saturate. It may also permit saturation of the output inductor at higher input voltages, for example, above 60 volts. A higher ripple on the output voltage resulting from inductor saturation may be acceptable above 60 volts, since the unit is operating above its normal operating range.

Figure 5:
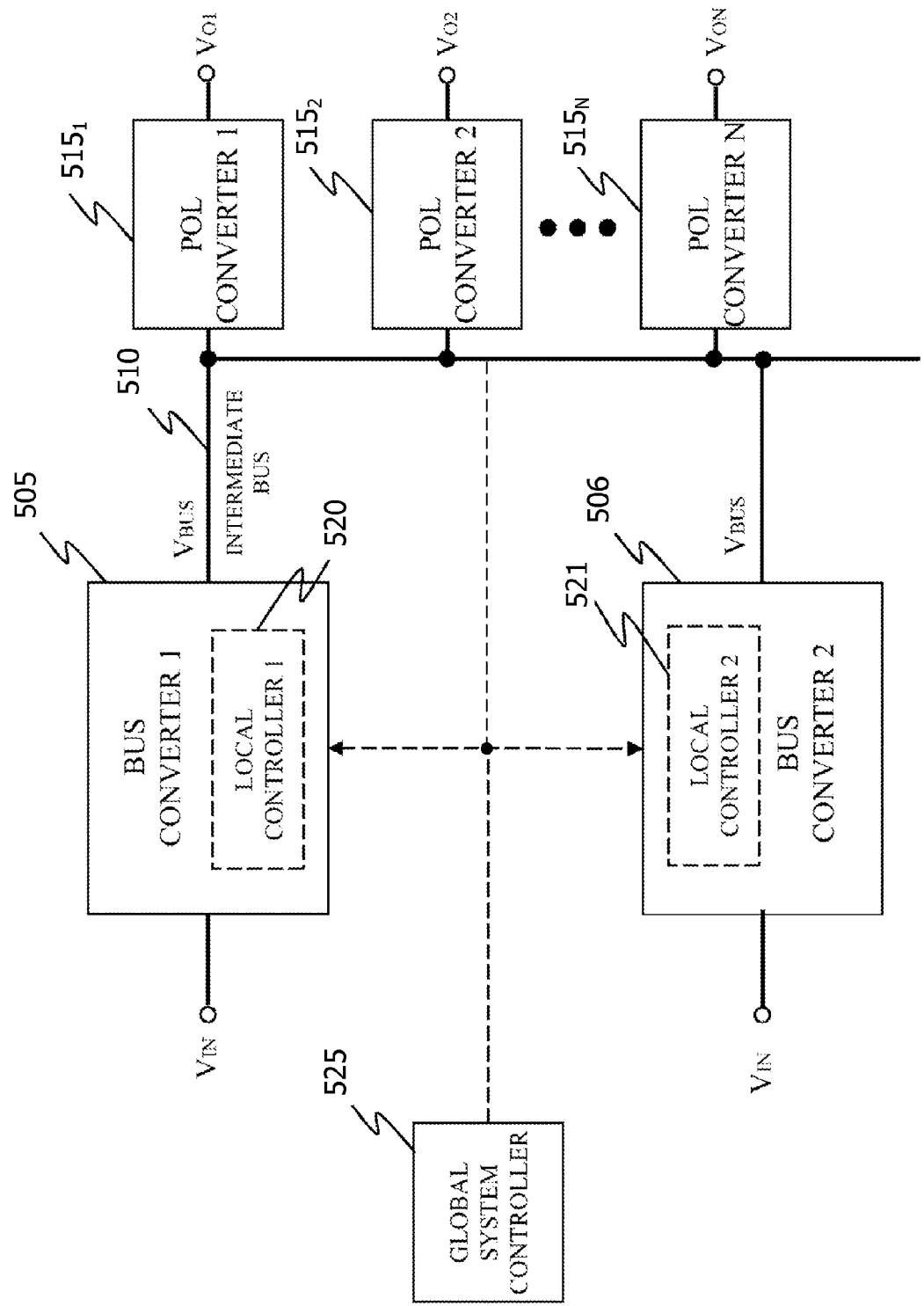
FIG. 5 is a block diagram of an exemplary intermediate bus power system.

FIG. 5 is a block diagram of an exemplary intermediate bus power system 500. Intermediate bus power system 500 includes first and second parallel connected bus converters 505 and 506 that convert an input voltage $V_{IN}$ into a bus voltage $V_{BUS}$ on an intermediate bus 510. Paralleling is necessary when a total system load is more than a full power that can be delivered by one bus converter alone. Otherwise, some systems use redundant bus converters in parallel such that if one bus converter shuts down, the other one picks up the system load without any interruption. In the illustrated embodiment, the input voltage $V_{IN}$ is the same input voltage for both of first and second parallel connected bus converters 505 and 506, although different input voltages may also be applied. Intermediate bus power system 500 also includes a plurality of POL converters $515_1$, $515_2$, ..., $515_N$, having inputs coupled to intermediate bus 510, that supply a corresponding plurality of output voltages $V_{O1}$, $V_{O2}$, ..., $V_{ON}$ using the bus voltage $V_{BUS}$ on intermediate bus 510. In some embodiments, each bus converter's output will have circuitry so as to prevent reverse current flow from the other parallel bus converters.

Intermediate bus power system 500 further includes first and second local controllers 520 and 521 that are respectively coupled to first and second bus converters 505 and 506, as shown. Intermediate bus power system 500 additionally includes a global system controller 525 coupled to first and second bus converters 505 and 506.

First and second local controllers 520 and 521 provide local control of first and second bus converters 505 and 506, respectively. In alternative embodiments, the functions can be partitioned among a different set of circuits. For example, global system controller 525 may be a general controller or a hierarchical controller that provides supervisory and over-riding control of intermediate bus power system 500. Local controllers 520 and 521 (supported by global system controller 525) respectively regulate each of first and second bus converters 505 and 506 such that they share a total load current supplied to intermediate bus 510 equally or in a proportion that yields a higher overall system power efficiency while delivering a required bus voltage $V_{BUS}$. In other embodiments, global system controller 525, controller 520, and/or controller 521 may be in communication with one or more of POLs $515_1$, $515_2$, ..., $515_N$.

These load sharing characteristics are constrained by predetermined limits to meet other power system needs (e.g., transient load capability). In one embodiment, these limiting or paralleling conditions are determined by global system controller 525 and provided to first and second local controllers 520 and 521, which may then provide regulation and control sharing of each of first and second bus converters 505 and 506.

Alternatively, the load sharing employs a droop characteristic that does not require communication between paralleled bus converters 505 and 506. The variable set-point algorithm may utilize an adaptive droop system that varies the selected pulse width at any operating point along a $V_{out}$ vs. $V_{IN}$ curve. A PWM or FDM controller is programmed to have an adjustable margin. It is programmed to reduce the margin at a minimum load current and increase it at maximum load current. That is, the variable set-point reference at a given input voltage is shifted up slightly as the load current decreases and down slightly as the load current increases. The amount of shift is a design consideration and chosen based on a number of factors including the accuracy of paralleling desired.

Figure 6:
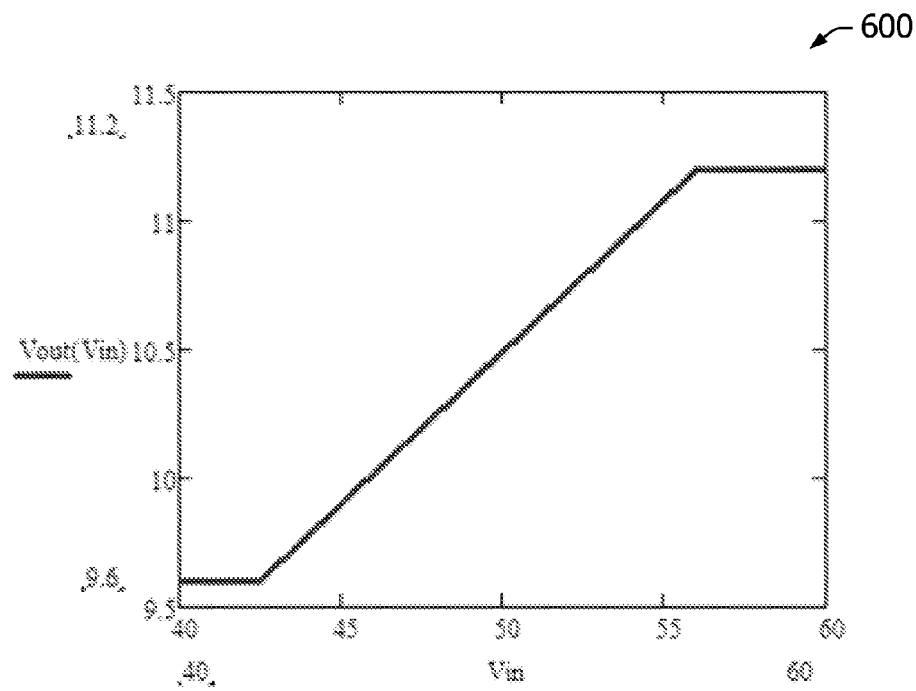
FIG. 6 is an exemplary graph used for determining an output voltage that follows an input voltage over a desired input voltage range.

FIG. 6 is an exemplary graph 600 used for determining an output voltage that follows an input voltage over a desired input voltage range. First, minimum and maximum input voltages $V_{IN\_MIN}$, $V_{IN\_MAX}$ and minimum and maximum output voltages $V_{BUS\_MIN}$, $V_{BUS\_MAX}$ are specified such that output voltage $V_{BUS}$ tracks input voltage $V_{IN}$. For example, as shown in graph 600, $V_{IN\_MIN}$=42.5V, $V_{IN\_MAX}$=56V, $V_{BUS\_MIN}$=9.6V, and $V_{BUS\_MAX}$=11.2V. Using mathematics and the line formed by the values provided above, a slope of the line is calculated as m=0.1185 and an intercept is calculated as b=4.563V. The desired behavior of causing a reference voltage $V_{ref}$ to track the input voltage $V_{IN}$ is given by:

$$V_{ref}=m*V_{IN}+b \qquad \text{Eq. 4}$$

$V_{ref}$ represents the reference voltage, m represents the calculated slope, $V_{IN}$ represents the input voltage, and b represents the calculated intercept.

Assuming steady state operation where $V_{BUS}=V_{ref}$, Eq. 4 is simplified by substituting Eq. 1 into $V_{IN}$ of Eq. 4, resulting in:

$$V_{ref}=b*D/(D-m*n) \qquad \text{Eq. 5}$$

In Eq. 5, b represents the calculated intercept, D represents duty cycle, m represents the calculated slope, and n represents a transformer turns ratio.

Figure 7:
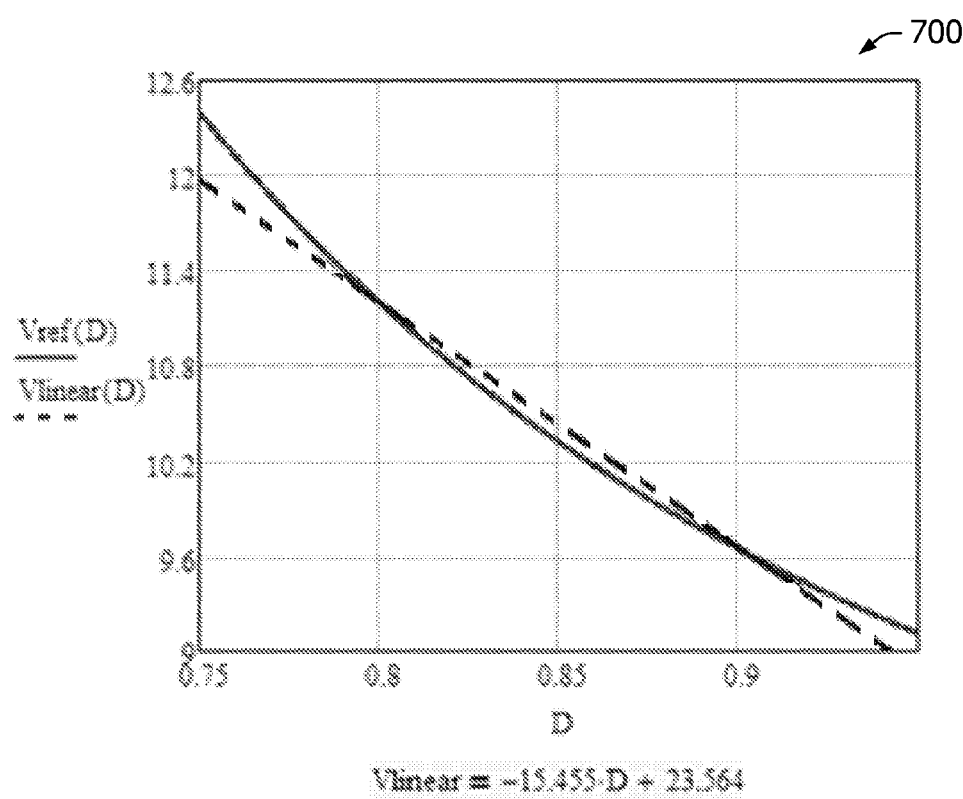
FIG. 7 is an exemplary graph showing output voltage as a function of duty cycle.

FIG. 7 is an exemplary graph 700 of output voltage as a function of duty cycle. The reference voltage $V_{ref}$ needs to be changed from a fixed value to a value that approximately follows Eq. 5, which is plotted on graph 700. Two points $V_{ref\_1}$ and $V_{ref\_2}$ are selected to fit a line through. In the exemplary embodiment, $V_{ref\_1}$ is 9.6V and $V_{ref\_2}$ is 11.2V. The resulting duty cycles are $D_{ref\_1}$=D(9.6V)=0.904, and $D_{ref\_2}$=D(11.2)=0.8. The slope $m_2$ is then calculated to be $m_2$=−15.455V. Using the equation of a line y=mx−$mx_0$+$y_0$, where $x_0=D_{ref\_1}$ (9.6V) and $y_0$=9.6V, then: $y_0-m_2x_0$=23.564V. Plugging these values into the equation of a line results in a linear approximation given by:

$$V_{linear}=-15.455*D+23.564 \qquad \text{Eq. 6}$$

Provided for example purposes only, an exemplary digital processor-based implementation of Eq. 6 will now be provided. The exemplary implementation includes voltage-divider resistors, the values of which are design dependent. Additionally, the digital processor will have different resolution depending on the analog to digital (ADC) converter channel used, for example, 10 bits, 15 bits, or 16 bits. Implementing Eq. 6 using the digital processor, provides a reference voltage given by:

$$V_{ref}=-(15.455*K1)*(D*K4)+23.564*K1 \qquad \text{Eq. 7}$$

In Eq. 7, K1 is a factor based on a resistor divider=2^15/16.21V, which is determined using a 15-bit resolution on the ADC converter. These values may vary from processor to processor, as will the design voltage sense resistors coupled to inputs of the ADC pins. K4 is a full duty cycle of 3145 counts (also processor dependent), and D is the duty cycle.

Simplifying and rounding Eq. 7 for faster and easier microprocessor implementation results in:

$$V_{ref}=K3*(C1-D)=10*(4763-D) \qquad \text{Eq. 8}$$

As used in the control loop 400 by reference voltage generator 300, K3=10 and C1=4763. C1 is based on duty cycle information and therefore includes information based on the input voltage $V_{IN}$. Because C1 includes input voltage $V_{IN}$ information, the reference voltage $V_{ref}$ that follows the input voltage $V_{IN}$ is determined without having to directly measure input voltage $V_{IN}$. The derivations of equations 6-8 are based on one specific design with specific voltages and have been provided for exemplary purposes only. Accordingly, this example should not be viewed as limiting in any manner.

An exemplary technical effect of the methods and systems described herein includes at least one of: (a) generating an output direct current (DC) voltage from an input voltage received from an input voltage source using a power converter having a primary stage coupled to a secondary stage; and (b) implementing, by a control circuit coupled to the power converter, a self-adjusting set-point control algorithm to generate the output DC voltage without using an input voltage measurement, wherein the output DC voltage follows the input voltage over at least a portion of an input voltage range.

Exemplary embodiments of systems and methods for power converters are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power conversion system, comprising:
a power converter comprising a primary stage coupled to a secondary stage to generate an output direct current (DC) voltage from an input voltage received from an input voltage source; and
a control circuit coupled to the power converter, the control circuit configured to implement a self-adjusting set-point control algorithm to generate the output DC voltage based on a reference voltage signal and without using an input voltage measurement, wherein the output DC voltage follows the input voltage over at least a portion of an input voltage range, wherein the control circuit comprises:
a reference voltage generator comprising:
a regulator configured to output a duty cycle feedback signal that is a ratio of an active duty cycle divided by a full duty cycle; and
a multiplier configured to generate the reference voltage signal by multiplying the duty cycle feedback signal by a predetermined gain value.

2. The system as recited in claim 1, wherein said control circuit is configured to implement the self-adjusting set-point control algorithm through active regulation digital control of the power converter.

3. The system as recited in claim 1, wherein said control circuit comprises:
an error signal generator configured to generate an error signal based on a comparison of the reference voltage signal to a measured output voltage of said power converter; and
a duty cycle signal generator configured to generate a duty cycle control signal based on the error signal.

4. The system as recited in claim 3, wherein to generate the reference voltage, said reference voltage generator is configured to:
compare the duty cycle feedback signal to a linearization constant;
multiply the compared duty cycle feedback signal and linearization constant by the predetermined gain value to generate a product;
filter the product between predetermined upper and lower limits; and
output the reference voltage signal.

5. The system as recited in claim 3, wherein to generate the error signal, said error signal generator is configured to:
receive an output voltage signal representing a measured output voltage of said power converter multiplied by a conversion factor; and
subtract the output voltage signal from the reference voltage signal.

6. The system as recited in claim 3, wherein said regulator is further configured to regulate an output voltage set-point in proportion to the input voltage without directly measuring the input voltage.

7. The system as recited in claim 6, wherein to regulate the output voltage set-point, said regulator is configured to generate a pulse width modulation (PWM) signal based on the error signal.

8. The system as recited in claim 1, wherein the self-adjusting set-point control algorithm selects a self-adjusted set point value to facilitate maximizing a PWM duty cycle of said power converter.

9. A method of controlling a power conversion system operation, comprising:
generating, by a power converter, an output direct current (DC) voltage from an input voltage received from an input voltage source, the power converter including a primary stage coupled to a secondary stage;
generating, by a regulator of a reference voltage generator, a duty cycle feedback signal that is a ratio of an active duty cycle divided by a full duty cycle;
generating, by a multiplier of the reference voltage generator, a reference voltage signal by multiplying the duty cycle feedback signal by a predetermined gain value; and
implementing, by a control circuit coupled to the power converter, a self-adjusting set-point control algorithm to generate the output DC voltage based on the reference voltage signal and without using an input voltage measurement, wherein the output DC voltage follows the input voltage over at least a portion of an input voltage range.

10. The method as recited in claim 9, wherein implementing the self-adjusting set-point control algorithm comprises implementing the self-adjusting set-point control algorithm through active regulation digital control of the power converter.

11. The method as recited in claim 9, further comprising:
generating, by an error signal generator, an error signal based on a comparison of the reference voltage signal to a measured output voltage of the power converter; and
generating, by a duty cycle signal generator, a duty cycle control signal based on the error signal.

12. The method as recited in claim 11, wherein generating the reference voltage comprises:
comparing the duty cycle feedback signal to a linearization constant;
multiplying the compared duty cycle feedback signal and linearization constant by the predetermined gain value to generate a product;
filtering the product between predetermined upper and lower limits; and
outputting the reference voltage signal.

13. The method as recited in claim 11, wherein generating the error signal comprises:
receiving an output voltage signal representing a measured output voltage of the power converter multiplied by a conversion factor; and
subtracting the output voltage signal from the reference voltage signal.

14. The method as recited in claim 11, further comprising regulating, by the regulator, an output voltage set-point in proportion to the input voltage without directly measuring the input voltage.

15. The method as recited in claim 14, wherein regulating the output voltage set-point comprises generating a pulse width modulation (PWM) signal based on the error signal.

16. The method as recited in claim 9, wherein the self-adjusting set-point control algorithm selects a self-adjusted set point value to facilitate maximizing a PWM duty cycle of the power converter.

17. A control circuit for a power converter, said control circuit configured to implement a self-adjusting set-point control algorithm to generate an output DC voltage based on a reference voltage signal and without using an input voltage measurement of the power converter, wherein the output DC voltage follows the input voltage over at least a portion of an input voltage range, and wherein the reference voltage signal is generated by:
  a regulator that outputs a duty cycle feedback signal that is a ratio of an active duty cycle divided by a full duty cycle; and
  a multiplier that multiplies the duty cycle feedback signal by a predetermined gain value.

18. The control circuit as recited in claim 17, comprising:
a reference voltage generator configured to generate the reference voltage signal;
an error signal generator configured to generate an error signal based on a comparison of the reference voltage signal to a measured output voltage of the power converter; and
a duty cycle signal generator configured to generate a duty cycle control signal based on the error signal.

19. The control circuit as recited in claim 18, wherein to generate the reference voltage, said reference voltage generator is configured to:
  compare the duty cycle feedback signal to a linearization constant;
  multiply the compared duty cycle feedback signal and linearization constant by the predetermined gain value to generate a product;
  filter the product between predetermined upper and lower limits; and
  output the reference voltage signal.

20. The control circuit as recited in claim 18, wherein to generate the error signal, said error signal generator is further configured to:
  receive an output voltage signal representing a measured output voltage of the power converter multiplied by a conversion factor; and
  subtract the output voltage signal from the reference voltage signal.

\* \* \* \* \*